No. 613,102.
Patented Oct. 25, 1898.
J. D. WILSON.
SLED ATTACHMENT.
(Application filed Mar. 5, 1898.)
(No Model.)
Fig. 1,
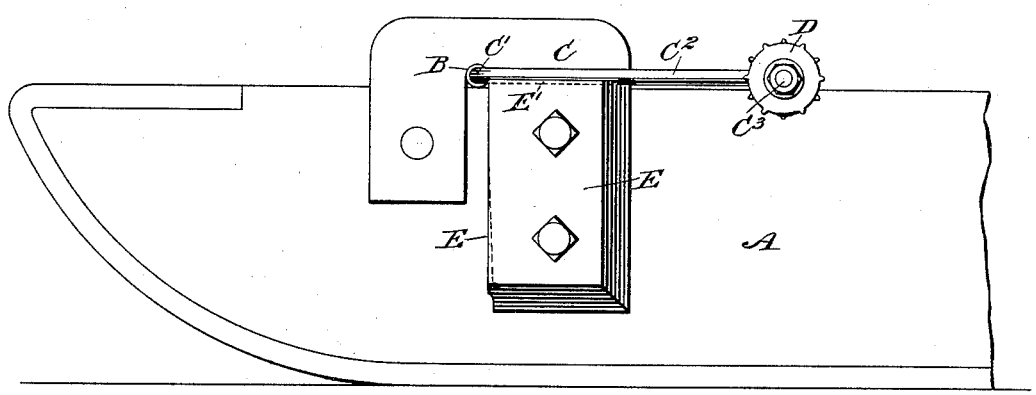
Fig. 2,
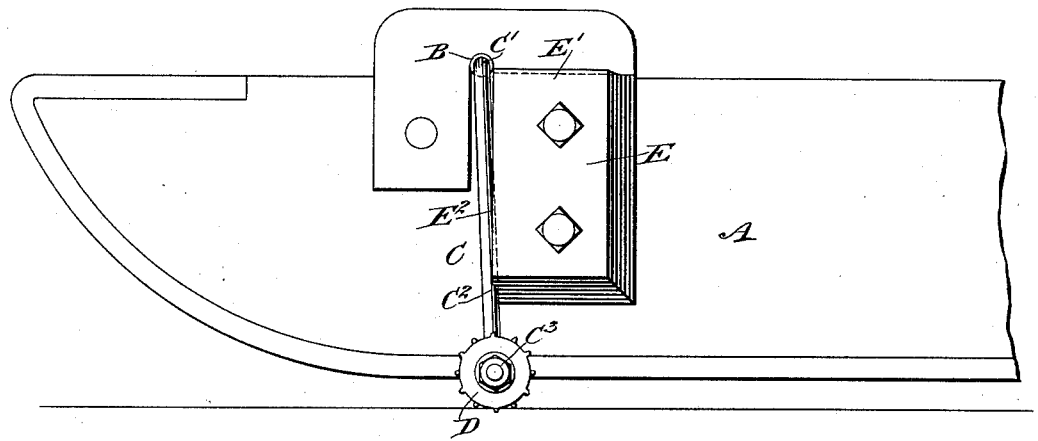
Fig. 3.
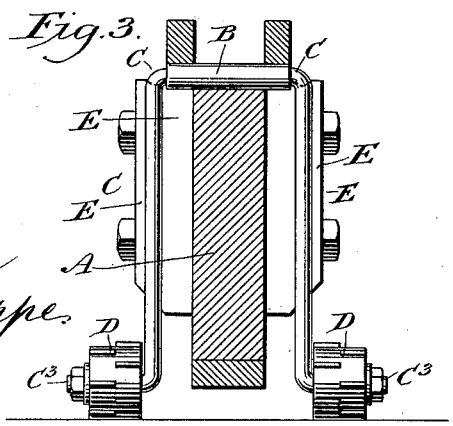
WITNESSES:
Edward Thorpe
INVENTOR
J. D. Wilson
BY
ATTORNEYS.
THE NORRIS PETERS CO., PHOTO-LITHO., WASHINGTON, D. C.

UNITED STATES PATENT OFFICE.

JOHN D. WILSON, OF HERON LAKE, MINNESOTA.

SLED ATTACHMENT.

SPECIFICATION forming part of Letters Patent No. 613,102, dated October 25, 1898.

Application filed March 5, 1898. Serial No. 672,687. (No model.)

*To all whom it may concern:*

Be it known that I, JOHN D. WILSON, of Heron Lake, in the county of Jackson and State of Minnesota, have invented a new and Improved Sled Attachment, of which the following is a full, clear, and exact description.

The object of the invention is to provide a new and improved sled attachment which is simple and durable in construction and arranged to permit of conveniently and quickly putting a sled on wheels to allow of running the sled over planks or snow or ice cleared places.

The invention consists of novel features and parts and combinations of the same, as will be described hereinafter and then pointed out in the claims.

Reference is to be had to the accompanying drawings, forming a part of this specification, in which similar characters of reference indicate corresponding parts in all the figures.

Figure 1 is a side elevation of the improvement as applied and showing the attachment in inactive position. Fig. 2 is a similar view of the same with the attachment in an active position, and Fig. 3 is a transverse section of the same.

The improved attachment is applied to each runner of a sled, A, near the forward and rear ends thereof, and the attachment consists of a bearing B, secured on the top of the runner, for receiving the middle portion $C'$ of a U-shaped axle C, straddling with its side arms $C^2$ the sides of the runner, as will be readily understood by reference to Fig. 3. The ends of the side arms $C^2$ of each axle are formed with outwardly-extending spindles $C^3$, on which are journaled wheels D, adapted to travel on the ground, as indicated in Figs. 2 and 3, to hold the bottom of the runner above the ground, so that the sled is mounted on wheels and can be readily run over planks or snow or ice cleared places without much exertion on the part of the team pulling the sled. Each of the wheels D is preferably provided on its periphery with transverse ribs; but such ribs are not essential.

In order to hold the axle in proper position when in use or when not in use, I provide cleats E, bolted or otherwise secured to the outside of the runner A, as is plainly indicated in the drawings, each cleat being provided with a top edge $E'$, arranged in alinement with the bottom portion of the bearing, so that when the axle is in an uppermost or non-active position, as shown in Fig. 1, then the side arms $C^2$ rest on the top edges of the cleats. Each of the cleats is also provided at its forward end with an edge $E^2$, arranged approximately in a vertical position, to form an abutment for the side arms $C^2$ when the axle is thrown in a forward direction from its resting position into an active position, as shown in Fig. 2.

Now it is evident that when the sled is running over snow or ice and reaches a cleared place or planks then the driver can readily swing the axles forward, so as to bring the wheels D upon the ground, and upon a further forward pull of the sled the runners rise automatically by the axle swinging into a vertical position until its side arms $C^2$ rest against the abutment edges $E^2$ formed by the cleats E. The sled is now mounted on wheels and can be readily run over the cleared ground or planks to its destination. When snow or ice is again reached, backing of the sled will cause a forward swinging of the axles, so as to lower the runners A to the ground, and then the axles can be swung forward and upward and then back to their resting position, the side arms $C^2$ being in engagement with the top edges $E'$ of the cleats.

By having the axle U-shaped two wheels can be employed on both sides of each runner, so as to properly support the sled and its load and permit of conveniently running over the cleared ground.

Having thus fully described my invention, I claim as new and desire to secure by Letters Patent—

1. A sled attachment comprising a U-shaped axle having its middle portion pivotally connected with the sled-runner and its ends bent outwardly to form spindles one on each side of the runner, wheels journaled on said spindles, and a cleat secured to the sled-runner in the rear of said axle and having edges at angles to each other and with which the axle is adapted to engage when in an operative or inoperative position, as set forth.

2. The combination with a sled-runner provided with a bearing, of a U-shaped axle pivotally mounted in said bearing to straddle said runner and having its ends bent to form spindles, wheels journaled on said spindles, and a cleat secured to the side of the runner in the rear of the bearing, said cleat having an approximately vertical front edge adapted to engage with a side of the axle when the latter is in operative position, and an edge at an angle to the first-named edge and on which the said side of the axle is adapted to rest when in inoperative position, as set forth.

3. A sled attachment, comprising a U-shaped axle pivoted to the top of the runner and having spindles, wheels journaled on the said spindles, and cleats secured to the sled-runner in the rear of the axle, and having edges standing at an angle to each other for the sides of the axle to rest on when the attachment is in use or out of gear, substantially as shown and described.

JOHN D. WILSON.

Witnesses:
 JNO. L. GESSELL,
 J. A. PEARSON.